Jan. 7, 1930.   H. R. WADE ET AL   1,742,885
FORMATION OF RUBBER PRINTING DIES OR BLOCKS
Filed Feb. 6, 1929
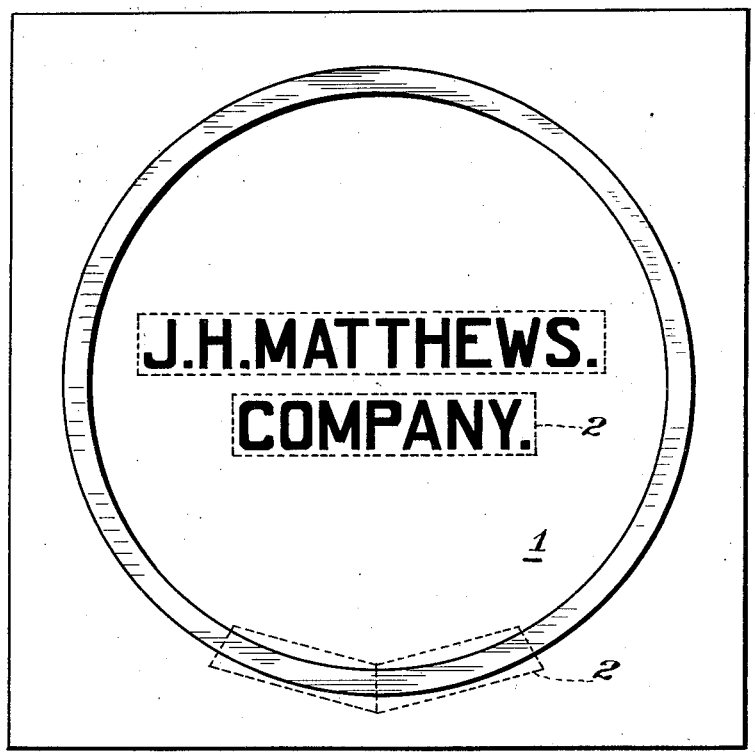
WITNESSES
INVENTORS Patented Jan. 7, 1930

1,742,885

UNITED STATES PATENT OFFICE

HAROLD R. WADE AND LEE M. HARLEY, OF PITTSBURGH, PENNSYLVANIA, ASSIGNORS TO JAS. H. MATTHEWS & COMPANY, OF PITTSBURGH, PENNSYLVANIA, A CORPORATION OF PENNSYLVANIA

FORMATION OF RUBBER PRINTING DIES OR BLOCKS

Application filed February 6, 1929. Serial No. 337,902.

Our invention relates to improvements in the formation of rubber printing dies or blocks, which being shaped in the form of flexible sheets are, after shaping, mounted on rigid carriers, perhaps plane-surfaced, but ordinarily cylindrical. Thus a rocking or rotary printing block is formed, useful, for example, for printing legends upon paper cartons. We cite this particular instance of the use by way of example, but do not exclude from the field of utility many other and varied particular uses.

The accompanying drawing shows in plan the face of a mold, and to it reference will be made, in describing the practice of our invention.

In forming rubber printing dies or blocks, a mold is provided, ordinarily of a preparation of gypsum, in the face of which the letters or other characters or devices desired are sunk in intaglio. The face of the mold ordinarily and conveniently extends in a plane. According to the hitherto prevailing procedure, a sheet of green—that is to say, of unvulcanized—rubber an eighth of an inch thick, more or less, (.144, to be exact) is laid upon the mold; strips of steel, commonly called bearers, are laid along opposite edges of the mold face, to limit the stroke of the pressing plunger; the mold then is introduced into a vulcanizing press; and the press is closed. The action of the press continues until vulcanization is completed. The mold is then opened, and the shaped sheet is removed and allowed to cool. After it has grown cold it is ready to be cemented to its rigid backing—commonly a cylindrical shell of metal.

According to our invention we provide sheet rubber in green state of the desired thickness (already indicated), and we provide also a sheet of "fabric", that is to say, woven cotton canvas filled and impregnated and over one surface, and preferably over both surfaces, smoothly spread with green rubber.

We cut the sheet rubber into strips and so apply it that it covers the incut portions of the mold, with minimum overlap upon the uncut plane area.

Referring to the drawing the position of the strips upon the face of mold 1 is indicated by dotted lines 2. Instead of covering with green sheet rubber the whole face of the mold, we cover only the incut areas, with minimum overlap upon the adjacent plane surface. Having so covered the incut design, and having applied bearers, which may advantageously be less in height than those required in the usual procedure, we close the vulcanizing press and allow it to remain closed for a short interval of time—a minute, more or less—during which the rubber is molded into the incut recesses of the design and, incidentally vulcanization is begun but not completed. We then open the mold again, lay the fabric in place, and if it be faced with green rubber over one surface only, it is laid fabric side down, rubber surface uppermost. We replace the bearers with others somewhat higher, and close the mold again and leave it closed till vulcanization is completed. Then we open the mold and remove the article. When after the initial step the mold is opened, the "flash", that is to say, the excess of rubber which spreads in a thin fin upon the face of the mold beyond the incut characters, may readily be removed, ordinarily by scraping with a putty-knife, or, if vulcanization has proceeded farther, it may be cut away.

By proceeding in the manner described, we gain the following advantages: First, we save rubber. By the old procedure, the field or unembossed portion of the die still consisted of the relatively great thickness of rubber present in the initial sheet throughout all its extent; by our procedure very much less sheet rubber is used. Second, we get better consolidation under pressure, of the rubber composing the letters or other characters of the design. Third, we get uniform thickness. Under the older practice, heavier lettering at one end of the mold than at the other resulted in inequality. Fourth, it is possible and advantageous to employ a fabric formed of a heavy canvas, and because of the heavy canvas incorporated in it, the die of our invention keeps its shape better than dies heretofore produced. Fifth, there is practically no shrinkage; and in the use of a plurality of dies for printing in a variety of colors, exact register of the successive impressions may be achieved. Finally, whereas the finished die of the old practice tends to curl inward, so that the face is concave, the article we produce, with fabric applied rubber side up, does not tend so to curl. It lends itself therefore to mounting upon a rigid support, particularly to a cylindrical support; and, being cemented, is held more securely. For the earlier article, because of its tendency to curl, breaks easily away from the support.

We claim as our invention:

1. The method herein described of forming a rubber die which consists in pressing and incompletely vulcanizing a body of rubber within a mold cavity, applying to the incompletely vulcanized body a sheet of fabric filled with unvulcanized rubber, and completing the vulcanization of the whole under pressure.

2. The method herein described of forming a rubber die bearing in relief devices standing apart upon an unrelieved surface, which consists in applying upon the mold which bears the devices in intaglio and correspondingly spaced apart separate sections of green sheet rubber covering the incut devices but leaving uncovered intervening plane surfaces, pressing into the incut recesses of the mold the sheet rubber so applied and while pressure is maintained effecting partial vulcanization, relieving the pressure, laying over the face of the mold and over the rubber pressed into the mold cavities a sheet of fabric filled with rubber, then restoring pressure and completing vulcanization.

3. The method herein described of forming a rubber die bearing devices in relief which consists in covering with green rubber the devices in intaglio upon the face of a mold, pressing into the recesses of the mold the green rubber, so applied and while pressure is maintained effecting partial vulcanization, relieving the pressure, laying upon the face of the mold and over the rubber pressed into the mold recesses a sheet of fabric filled with rubber, and restoring pressure and completing vulcanization.

4. The method herein described of forming a rubber die bearing devices in relief which consists in covering with green rubber devices formed in intaglio in a plane-faced mold, pressing into the recesses of the mold and partially vulcanizing in place the green rubber so applied, trimming the flash from the face of the mold, applying to the face of the mold and to the bodies of rubber so pressed into its recesses a sheet of rubber-filled fabric, and finally vulcanizing under pressure the article so assembled.

5. The method herein described of forming a rubber die which consists in pressing and incompletely vulcanizing a body of rubber within a mold cavity, applying to the incompletely vulcanized body a sheet of fabric having green rubber spread smoothly over one surface at least, the rubber-surfaced side of the sheet being away from the body of rubber within the mold cavity, and completing vulcanization of the whole under pressure.

In testimony whereof we have hereunto set our hands.

HAROLD R. WADE.
LEE M. HARLEY.